United States Patent [19]

Bernard et al.

[11] 4,365,011

[45] Dec. 21, 1982

[54] PROCESS FOR PREPARING PIECES COMPOSED OF SOLID ELECTROLYTE BASED ON STABILIZED ZIRCON AND TO PIECES OBTAINED BY THIS PROCESS

[75] Inventors: Herve Bernard, Grenoble; Jean-Claude Viguie, Eybens, both of France

[73] Assignee: Commissariat a l'Energie Atomique, Paris, France

[21] Appl. No.: 228,897

[22] Filed: Jan. 27, 1981

[30] Foreign Application Priority Data

Feb. 8, 1981 [FR] France .................................. 80 02788

[51] Int. Cl.³ .............................................. H01M 8/12
[52] U.S. Cl. ...................................... 429/193; 264/65; 423/608; 429/33
[58] Field of Search .................... 429/31, 33, 193, 191; 204/195 S; 264/65; 423/608

[56] References Cited

U.S. PATENT DOCUMENTS 1,624,162  4/1927  Hendrik ............................... 423/608
2,599,326  6/1952  Gruen et al. ......................... 423/608

FOREIGN PATENT DOCUMENTS 750994   1/1967  Canada .................................. 429/33
1048839  11/1966  United Kingdom ................... 429/33

OTHER PUBLICATIONS

Kiukkola et al, Measurements on Galvanic Cells Involving Solid Electrolytes, Tech. Report on Thermodynamics of Metal Solutions, 8/56, pp. 1-4, Dept. of Metallurgy MIT.

*Primary Examiner*—Donald L. Walton
*Attorney, Agent, or Firm*—Pearne, Gordon, Sessions, McCoy & Granger

[57] ABSTRACT

The invention relates to a process for preparing pieces of solid electrolyte based on stabilized zircon having an improved conductivity due to the addition of $Al_2O_3$. According to the process, an alcoholic solution is prepared of a salt of zirconium, a salt of a metal stabilizing zircon such as yttrium and a salt of aluminium; from this solution is formed a coprecipitate of hydroxide of zirconium, hydroxide of said metal and hydroxide of aluminium; the precipitate is washed by means of a hydrophilic solvent to eliminate the traces of water, then is dried and calcined in air; a piece of solid electrolyte is then formed by compression and sintering from the powder obtained.

The invention is applicable to the production of solid electrolytes for cell for electrolysis of water vapor or for fuel cell.

17 Claims, 3 Drawing Figures

PROCESS FOR PREPARING PIECES COMPOSED OF SOLID ELECTROLYTE BASED ON STABILIZED ZIRCON AND TO PIECES OBTAINED BY THIS PROCESS

The present invention relates to a process for preparing pieces composed of solid electrolyte based on stabilised zircon and to pieces obtained by this process.

It relates more precisely to the obtaining of a solid electrolyte based on zircon which has an improved electric conductivity with respect to presently known solid electrolytes of this type, this rendering it particularly advantageous for use as solid electrolyte in a cell for electrolysis of water vapour at high temperature intended for the production of gaseous hydrogen, or as solid electrolyte of a fuel cell.

It is known that, in view of the considerable amount of hydrogen needed in the chemical industry, techniques have recently been developed for the production of hydrogen by electrolysis of water vapour at high temperature in cells comprising a solid electrolyte generally constituted by a piece of ceramic conducting oxygen ions, disposed between two electrodes which act as anode and cathode respectively.

In these cells, the water vapour is introduced at a temperature of about 760° to 950° C. in the cathodic part of the cell, and it is reduced to gaseous hydrogen on the surface of the solid electrolyte when a voltage of the order of magnitude of a volt is applied to the terminals of the cell.

In such cells, the essential resistive dissipation is situated at solid electrolyte level and it is consequently important to limit its resistivity to reduce the electrolysis voltage at the terminals of the cell.

Up to the present time, electrolytes have been used in such cells, based on zircon comprising small additions of a stabilising oxide such as calcium oxide, yttrium oxide, cerium oxide, scandium oxide or a rare earth oxide.

To improve the conductivity of electrolytes of this type, it has been envisaged to add small quantities of another metal oxide thereto in order to influence certain factors such as the density, porosity and particle dimensions of the pieces obtained, which factors generally exert an influence on the conductivity.

However, up to the present time, it has been impossible to obtain substantial improvement in the conductivity of electrolytes of this type by the addition of small quantities of another oxide.

It is precisely an object of the present invention to provide a process for preparing a solid electrolyte based on stabilised zircon which enables the conductivity of this electrolyte to be improved by the addition of controlled quantities of aluminium oxide.

The process, according to the invention, for preparing a piece of solid electrolyte based on stabilised zircon, comprises the following steps of:

(a) preparing an alcoholic solution of a salt of zirconium, a salt of a metal stabilising the zircon and an aluminium salt;

(b) forming from said solution a coprecipitate of hydroxide of zirconium, hydroxide of said metal and aluminium hydroxide, (c) separating the precipitate thus obtained, (d) washing said precipitate by means of a hydrophilic solvent to eliminate the major part of the water, (e) drying the precipitate thus washed at a temperature lower than 100° C. to eliminate the rest of the water, (f) calcining it in air, (g) forming, from the powder obtained by calcination of said precipitate, a blank of said piece by compression of said powder, (h) and sintering the blank thus obtained in an atmosphere of hydrogen.

The process as characterised hereinabove thus presents the advantage of leading to a solid electrolyte being obtained of which the density and conductivity are improved due to the addition of small quantities of alumina at the stage of preparation of the electrolyte powder. In fact, it is assumed that the mode of preparing the powder by coprecipitation of the different hydroxides and the fact of subjecting the precipitate obtained to washing by a hydrophilic solvent and to a drying at a temperature lower than 100° C. enables a piece to be obtained by compression and sintering, in which the alumina is distributed in the particles rather than at the joins of particles, with larger particle dimensions, which improves the conductivity of the piece obtained.

According to the invention, the contents of zirconium salt, of salt of said stabilising metal and of aluminium salt in the starting solution are chosen to obtain the best resistivity.

The content of zirconium salt is preferably such that the relative proportions between zirconium, the stabilising metal and the aluminium present in solution correspond to an electrolyte composition comprising 90 to 91% in moles of zircon, the rest being constituted by yttrium oxide and alumina.

These contents are advantageously such that the relative proportions between the zirconium, the stabilising metal and the aluminium in solution correspond to a solid electrolyte composition comprising 90 to 91% in moles of zirconium oxide, 7 to 10% in moles of oxide of the stabilising metal and up to 2% in moles of alumina.

According to the invention, the stabilising metal is a metal whose oxide enables the zirconium to be stabilised. By way of example, this metal may be yttrium, scandium, calcium, cerium or a metal of the rare earth series. Yttrium is preferably used.

When the solution includes a zirconium salt, an yttrium salt and an aluminium salt, the relative proportions between the zirconium, yttrium and aluminium present in the solution are advantageously such that they correspond to a composition of solid electrolyte comprising 90 to 91% of $ZrO_2$, 8 to 9% of yttrium oxide and 1% of alumina, these percentages also being expressed in moles.

In fact, the best results are obtained when the alumina content of the solid electrolyte is 1%; however, good results are also obtained when the alumina content of the electrolyte is between 0.5% and 1%.

According to the invention, the solution is formed by dissolution of the salts in an alcohol such as ethyl alcohol.

When it is desired to make a piece of solid electrolyte comprising zirconium oxide, yttrium oxide and aluminium oxide, the salts used for preparing this solution are advantageously an alcholate of zirconium such as zirconium butylate, yttrium nitrate and acetyl acetonate of aluminium. After having prepared the alcoholic solution of zirconium salt, salt of the stabilising metal and aluminium salt, a coprecipitate is formed from this solution of zirconium hydroxide, hydroxide of the stabilising metal such as yttrium and aluminium hydroxide, by hydrolysis by means of ammonia, the solution being subjected to stirring.

After precipitation, the coprecipitate obtained is separated by conventional techniques, for example by filtration, then this precipitate is washed by means of a hydrophilic solvent such as isopropyl alcohol, to eliminate the major part of the water present in the coprecipitate.

After this operation, the precipitate is dried at a temperature lower than 100° C. to eliminate the last traces of water and is clacined in air to obtain a powder of oxides of zirconium, yttrium and aluminium.

The drying step of the precipitate is preferably effected by dispersing the precipitate washed by the hydrophilic solvent in a liquid capable of forming an azeotropic mixture with water at a temperature lower than 100° C., and by heating the liquid in which the precipitate is disposed so as to extract the water by distillation in the form of azeotropic mixture.

Benzene may be cited by way of example of liquid which may be used.

However, the drying step may be effected by evaporation in vacuo or by lyophilisation.

The final drying may also be carried out by using a hydrophilic solvent, for example continuing washing by means of the hydrophilic solvent for a sufficient length of time to elminate the last traces of water.

The calcination step is advantageously carried out at a temperature of 700° to 800° C. for 3 to 4 hours, when the powder is constituted by $ZrO_2$, $Y_2O_3$ and $Al_2O_3$. In fact, under these conditions, a sufficiently reactive powder is obtained by calcination which enables sintering to be effected at relatively low temperatures.

This powder is then shaped by compression, advantageously at a pressure of 1.5 to 2 t/cm². An organic binding agent such as methyl methacrylate is possibly added to the powder before compression.

After compression, the blank obtained is sintered in an atmosphere of moist hydrogen.

The duration and temperature of sintering are chosen as a function of the reactivity of the powder obtained by calcination, so as to obtain a piece presenting a high density and low porosity. In the case of a solid electrolyte constituted by oxides of zirconium, yttrium and aluminium, sintering is advantageously carried out at a temperature of about 1300° C., for about 6 hours when calcination has been effected under the conditions mentioned above.

According to a variant embodiment of the process of the invention, which is adapted to making a piece of solid electrolyte comprising on its surface a network of conducting particles, a metal powder, for example a nickel powder, is distributed on the surface of the blank, so as to obtain, by co-sintering of the metal powder and of the oxide powder, a cathode-electrolyte assembly which may be used in particular in a cell for electrolysis of water vapour at high temperature.

In this case, a quantity of metal particles is distributed on one of the surfaces of the blank before or after compression of the powder, which, after the whole is sintered, constitutes either a conducting cathodic network or points of fixation for a thin conducting deposit deposited thereafter on the piece along an outline determined by conventional techniques.

It will be specified that, according to the process of he invention, the pieces may be made in the form of cylinders with a diameter of 20 mm and a thickness of 5 mm, for example, and having a density which corresponds to 98% of the theoretical density. Tubular objects may also be made by the process of the invention, or flat objects of larger dimensions, for example discs with a diameter of 90 mm and a thickness of 0.6 mm and having a density corresponding to 98% of the theoretical density.

Such pieces may constitute the electrochemically active part of the core of a water vapour electrolyser at 800°/900° C.

The invention will be more readily understood on reading the following description with reference to the accompanying drawings, in which.

This example relates to the preparation of a piece of solid electrolyte constituted by zircon, yttrium oxide and alumina.

A solution is firstly prepared in ethyl alcohol of zirconium butylate and yttrium nitrate so as to obtain a relative proportion of yttrium and zirconium corresponding to the composition (in moles): 91% of $ZrO_2$ and 8% of $Y_2O_3$. To this solution is added acetyl acetonate of aluminium in the proportion which corresponds to the final composition (in moles):

91% of $ZrO_2$,
8% of $Y_2O_3$, and
1% of $Al_2O_3$.

From this solution is formed a coprecipitate of hydroxides of zirconium, of yttrium and of aluminium by means of ammonia, the solution being subjected to stirring. After formation of the precipitate, the latter is separated from the solution by filtration, then is washed with isopropyl alcohol to eliminate the major part of the water.

After washing, the precipitate is introduced in a distillation apparatus containing such a quantity of benzene that it corresponds to an excess of benzene with respect to the isopropyl alcohol-benzene-water azeotropic mixture, then the precipitate dispersed in the benzene is heated to extract the water and isopropyl alcohol present in the precipitate by distillation in the form of azeotropic mixture. Distillation is stopped when pure benzene is present. The precipitate is then separated from the benzene by filtration, then is dried in air and calcined in air at 750° C. for 3 hours. An organic binding agent constituted by methyl methacrylate is then added to the powder thus obtained, in such a quantity that it represents of the order of the % by weight of the mixture of powder and binding agent.

A blank of the piece to be obtained is then made from this mixture, by compressing this mixture in a double-effect press, at a pressure of 1.5 to 2 t/cm², then the compressed blank thus obtained is sintered in an atmosphere of moist hydrogen, i.e. non-dried hydrogen, at 1300° C. for 6 hours.

After sintering, the piece obtained comprises 91% of $ZrO_2$, 8% of $Y_2O_3$ and 1% of $Al_2O_3$, the % being expressed in moles.

The resistivity of the piece obtained is measured by the method of complex impedances, in A.C. current, at a temperature of 850° C. and it is thus found that this piece has a resistivity of 15.5 ohms. cm.

Figure 1:
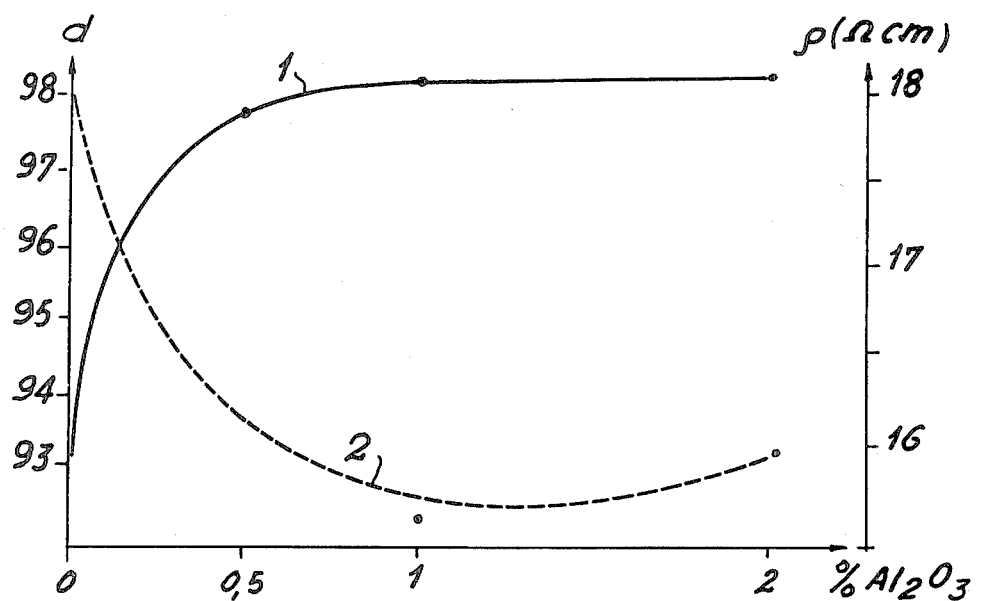
FIG. 1 is a diagram which illustrates, on the one hand, the variations in the density of the electrolyte as a function of its alumina content (curve 1) and, on the other hand, the variations in the resistivity of the electrolyte as a function of its alumina content (curve 2).

Different pieces of solid electrolyte are made in the same manner, which differ solely by their alumina and yttrium oxide content, the yttrium oxide content varying from 7 to 9% in moles, whilst the alumina content varies from 0 to 2% in moles, then the density and resistivity of the pieces obtained are determined. The results of these measurements are given in FIG. 1 in which curve 1 illustrates the variations in the density d of the piece (expressed in % of the theoretical density) as a function of the alumina content (% in moles) of the pieces, and curve 2 illustrates the variations in the resistivity (ohm.cm) as a function of the alumina content of the solid electrolyte.

It is observed from this Figure that, for a solid electrolyte not containing alumina, the resistivity is 18 ohms.cm and that the addition of 1% of alumina lowers the resistivity to a value of 15.5 ohms.cm, this representing a reduction of the order of 15%. Furthermore, it is observed that the addition of quantities of alumina greater than 1% in moles does not improve the result obtained.

Concerning the density, it is observed that the addition of alumina also improves the density of the pieces obtained. Thus, with 1% of alumina, a density is obtained, representing 98% of the theoretical density, whilst for an electrolyte without alumina, the density is only 93% of the theoretical density.

Furthermore, it is specified that by making the measurements of resistivity at a temperature of 400° C., the overall conductivity gain measured in alternating current by complex impedance spectroscopy is 50% for a piece having the composition 91% $ZrO_2$, 8% $Y_2O_3$ and 1% $Al_2O_3$;.

Figure 2:
FIG. 2 is a micrography illustrating the microstructure of a solid electrolyte containing 0.5% of alumina.
Figure 3:
FIG. 3 is a micrography illustrating the microstructure of a solid electrolyte not containing alumina.

With reference to FIGS. 2 and 3 which respectively illustrate the microstructure of two pieces obtained by the process of the invention having the following compositions:

FIG. 2—91% $ZrO_2$, 8.5% $Y_2O_3$ and 0.5% $Al_2O_3$
FIG. 3—91% $ZrO_2$, 9% $Y_2O_3$ it is observed that the addition of alumina enables the dimensions of particles such as 3 to be increased. Furthermore, it is observed that the alumina is not distributed at the joins of particles.

What is claimed:

1. Process for preparing a piece of solid electrolyte based on stabilized zircon, comprising the following steps of:
   (a) preparing an alcoholic solution of a salt of zirconium, a salt of a metal stabilizing the zircon and an aluminium salt, the content of said salt of aluminum in said solution being such that it corresponds to a composition of solid electrolyte comprising up to 2% in moles of alumina;
   (b) forming from said solution a coprecipitate of hydroxide of zirconium, hydroxide of said metal and aluminium hydroxide;
   (c) separating the precipitate thus obtained;
   (d) washing said precipitate by means of a hydrophilic solvent to eliminate the major part of the water;
   (e) drying the precipitate thus washed at a temperature lower than 100° C. to eliminate the rest of the water;
   (f) calcining it in air;
   (g) forming, from the powder obtained by calcination of said precipitate, a blank of said piece by compression of said powder;
   (h) and sintering the blank thus obtained in an atmosphere of hydrogen.

2. The process of claim 1, wherein the contents of salt of zirconium, salt of said metal and salt of aluminium in said solution are such that the relative proportions between the zirconium, said stabilizing metal and aluminium present in the solution, correspond to a composition of solid electrolyte comprising 90 to 91% in moles of zirconium oxide, from 7 to 10% in moles of oxide of said metal and up to 2% in moles of alumina.

3. The process of either one of claims 1 and 2, wherein said stabilising metal is yttrium.

4. The process of claim 3, wherein the contents of salt of zirconium, salt of yttrium and salt of aluminium in said solution are such that the relative proportions between zirconium, yttrium and aluminium present in said solution correspond to a composition of solid electrolyte comprising 90 to 91% in moles of $ZrO_2$, 8 to 9% in moles of yttrium oxide and 1% in moles of alumina.

5. The process of any one of claims 1 to 4, wherein said solution is formed by dissolution of said salts in ethyl alcohol.

6. The process of any one of claims 3 to 5, wherein the zirconium salt is an alcoholate of zirconium, the yttrium salt is nitrate of yttrium and the aluminium salt is acetyl acetonate of aluminium.

7. The process of any one of claims 1 to 6, wherein said precipitate is formed by means of ammonia, the solution being subjected to stirring.

8. The process of any one of claims 1 to 7, wherein the hydrophilic solvent is isopropyl alcohol.

9. The process of any one of claims 1 to 8, wherein the step of drying the precipitate is effected by dispersing the precipitate in a liquid capable of forming an azeotropic mixture with water at a temperature lower than 100° C. and heating the liquid in which said precipitate is dispersed to extract the water in the form of azeotropic mixture by distillation.

10. The process of claim 9, wherein the said liquid is benzene.

11. The process of any one of claims 3 to 10, wherein said precipitate is calcined in air at a temperature of between 600° and 800° C. for a period of time of between 3 and 4 hours and sintering is carried out at a temperature of about 1300° C. for about 6 hours.

12. The process of any one of claims 1 to 11, wherein the powder obtained by calcination of said precipitate is mixed with an organic binding agent and said blank is formed by compression of the mixture of powder and binding agent.

13. The process of claim 12, wherein the binding agent is methyl methacrylate.

14. The process of any one of claims 3 to 13, wherein said powder is compressed at a pressure of 1.5 to 2 t/cm$^2$.

15. The process of any one of claims 1 to 14, wherein a powder of conducting metal is dispersed on the surface of the blank so as to obtain, by co-sintering of said powders, a cathode-solid electrolyte assembly.

16. A piece of solid electrolyte based on stabilised zircon obtained by carrying out the process of any one of claims 3 to 14, wherein it comprises 90 to 91% of zirconium oxide, 7 to 10% of yttrium oxide and up to 2% alumina, these percentages being expressed in moles.

17. The piece of solid electrolyte of claim 16, wherein it includes 1% alumina.

* * * * *

UNITED STATES PATENT AND TRADEMARK OFFICE
CERTIFICATE OF CORRECTION

PATENT NO. : 4,365,011

DATED : December 21, 1982

INVENTOR(S) : Herve Bernard & Jean-Claude Viguie

It is certified that error appears in the above—identified patent and that said Letters Patent is hereby corrected as shown below:

On the title page;

Section [30] Foreign Application Priority Data should read

--Feb. 8, 1980 [FR]   France.....................80 02788--;

Column 3, line 13, "clacined" should be changed to read --calcined--;

Column 3, line 29, "elminate" should be changed to read --eliminate--; and

Column 3, line 68, "he" should be changed to read --the--.

Signed and Sealed this

Sixteenth Day of July 1985

[SEAL]

Attest:

DONALD J. QUIGG

Attesting Officer    Acting Commissioner of Patents and Trademarks